United States Patent [19]

Aoki

[11] Patent Number: 4,726,756
[45] Date of Patent: Feb. 23, 1988

[54] TEMPERATURE CONTROL BLOW MOLDING EQUIPMENT IN INJECTION STRETCH BLOW MOLDING MACHINE

[76] Inventor: Katashi Aoki, 6037, Ohazaminamijo, Sakakimachi, Hanishina-gun, Nagano-ken, Japan

[21] Appl. No.: 736,445

[22] Filed: May 21, 1985

[30] Foreign Application Priority Data

May 22, 1984 [JP] Japan .................... 59-103456

[51] Int. Cl.⁴ .................. B29C 49/06; B29C 49/64
[52] U.S. Cl. .................... 425/526; 264/530; 425/529; 425/530; 425/534; 425/538; 425/539; 425/540
[58] Field of Search ............. 425/526, 529, 530, 534, 425/538, 539, 540, 546, 589, 595; 264/530

[56] References Cited

U.S. PATENT DOCUMENTS

| | | | |
|---|---|---|---|
| 3,966,378 | 6/1976 | Valyi | 425/526 |
| 4,099,905 | 7/1978 | Nash et al. | 425/589 |
| 4,105,391 | 8/1978 | Aoki | 425/526 |
| 4,172,872 | 10/1979 | Nagai | 425/546 |
| 4,315,728 | 2/1982 | Hehl | 425/589 |

*Primary Examiner*—Jay H. Woo
*Assistant Examiner*—Timothy W. Heitbrink
*Attorney, Agent, or Firm*—Ostrolenk, Faber, Gerb & Soffen

[57] ABSTRACT

A temperature control blow molding equipment which has a temperature control mold and a blow mold on one seat body and which is used in an injection stretch blow molding machine comprising a disk-like moving plate intermittently rotatably disposed above a base disk, a plurality of neck molds provided at regular intervals under the carrying plate, and operation zones disposed at stop positions of the neck molds, the operation zones being necessary for a series of treatments from an injection molding of a parison to a removal of a molded article.

6 Claims, 8 Drawing Figures

TEMPERATURE CONTROL BLOW MOLDING EQUIPMENT IN INJECTION STRETCH BLOW MOLDING MACHINE

BACKGROUND OF THE INVENTION (1) Field of the Invention

The present invention relates to temperature control blow molding equipment which can be used in a molding machine capable of successively accomplishing a series of operations from injection molding a parison of a thermoplastic resin to stretch blow for molding a container therefrom and which has both a temperature control mold for the parison and a blow mold.

(2) Description of the Prior Art

U.S. Pat. No. 4,105,391 discloses an injection-molded parison carried to a temperature control position, where a temperature distribution of the parison is adjusted, and the temperature-controlled parison is then delivered to a blow molding position, where it is molded in a blow mold into an article such as a bottle using the stretch blow molding method. Afterward, the molded article is carried to a removal position, where it is removed from a carrying means. This type of molding machine is well known and widely used.

In the above-mentioned known molding machine, there are an injecting operation zone, a temperature control operation zone, a stretch blow operation zone, and a mold release operation zone, and the operation in each zone is carried out as the workpiece is advanced or a carrying means such as a rotary disk. Further, the injecting operation zone requires the longest time interval, while the working periods in the other zones are extremely short. For this reason, the temperature control of the parison is best accomplished by taking the time necessary for the parison injection molding into consideration.

Generally, the time required for the temperature control of the parison and the parison temperature for it are determined on the basis of a temperature of the injection-molded parison, and the temperature of the parison varies even during its conveyance. Therefore, the temperature control of the parison is achieved by taking account of this temperature variation during the delivery. However, in the case of a polypropylene resin, the temperature control of which is more difficult than that of a polyethylene terephthalate resin, repeated observation has been necessary for the decision of a temperature control timing.

SUMMARY OF THE INVENTION

The present invention has now been achieved to solve the conventional problems mentioned above, and its object is to provide a new temperature control blow molding equipment which can effect a temperature control and a stretch blow molding of a parison continuously in a period of the temperature control process without setting any temperature control timing in view of a period necessary for an injection molding of the parison.

Another object of the present invention is to provide a temperature control blow molding equipment which permits carrying out a temperature control and a stretch blow molding of a parison in one operation zone, so that one of the conventional four operation zones can be omitted.

In order to accomplish the above mentioned objects, the present invention comprises a pair of locking plates, capable of opening and closing, disposed on a seat body, and a temperature control mold and a blow mold disposed in parallel dividedly in the pair of locking plates, the seat body being arranged in a stretch blow molding operation zone in the molding machine so as to transversely move together with the locking device thereon, whereby the above-mentioned temperature control mold and blow mold can alternately move to a parison stopped in the stretch blow operation zone.

Accordingly, the equipment of the present invention permits carrying out the temperature control and the stretch blow molding in one operation zone, with the result that the temperature control operation zone of a conventional molding machine can be omitted.

Additionally, the temperature-controlled parison can be immediately positioned in the blow mold by moving, together with the seat body, the two molds which are disposed in parallel, so that it is possible to continuously operate the stretch blow molding process during the wake of the temperature control phase. Thus, the temperature control timing need not take into consideration the time necessary for the injection molding, with the result that the stretch blow molding of the parison can always be accomplished under perfect temperature conditions.

The present invention will be further described in detail in reference to an embodiment shown in accompanying drawings.

BRIEF DESCRIPTION OF THE DRAWINGS

The drawings illustrate a temperature control blow molding equipment in an injection stretch blow molding machine regarding the present invention.

DETAILED DESCRIPTION OF THE INVENTION

Figure 3:
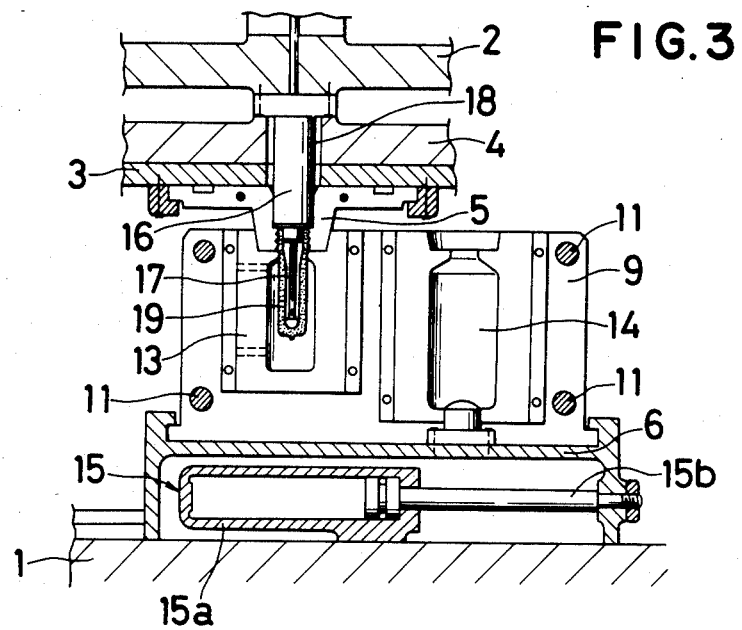
FIGS. 3 to 6 are partial sectional elevation front views showing the operation of the temperature control blow molding equipment in order.

In drawings, reference numeral 1 represents a base disk, and above this base disk 1, there is a supporting plate 4 for a horizontal carrying plate 3 which can move vertically together with an locking disk 2 disposed thereon (FIG. 3).

Figure 1:
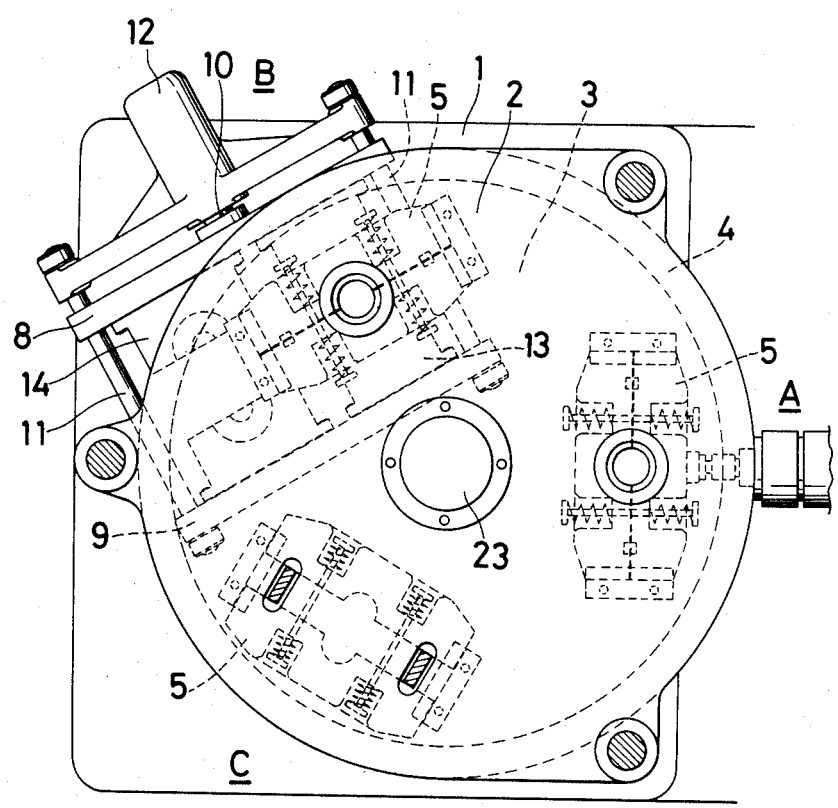
FIG. 1 is a partial cross-sectional plan view of the injection stretch blow molding machine.
Figure 2:
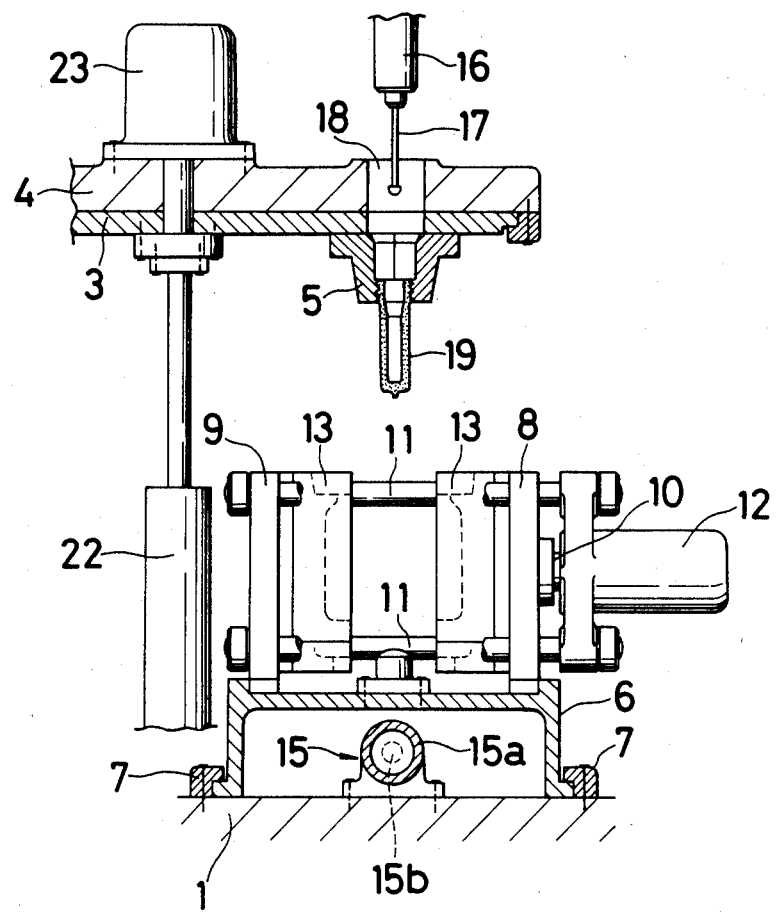
FIG. 2 is a partial sectional elevation side view of a stretch blow molding operation zone.

The carrying plate 3 comprises a disk rotatably supported under the supporting plate 4 and is adapted to be intermittently rotated every 120° in angle by a driving means 23 disposed on and in the middle of the supporting plate 4 (FIGS. 1 and 2). Further, three neck molds simultaneously having a nipping function are fixed at equal intervals under the carrying plate 3 so as to open in a radial direction of the carrying plate 3, and they can be stopped and utilized at an injecting operation zone A, a stretch blow operation zone B, and a removal operation zone C in this order.

In the stretch blow operation zone B, a box-like seat body 6 is provided on the base disk 1 so as to reciprocatively move along a guide member 7 disposed in a direction tangential to the carrying plate 3. On this seat body 6, a pair of locking lates 8 and 9 are disposed slidably in a radial direction of the carrying plate 3. The outside locking plate 8 is coupled, on the rear and central portion thereof, to a piston 10, and a pair of rods 11 is coupled to the inside locking plate 9 through the outside locking plate 8 and is further coupled to a locking cylinder 12, whereby the pair of locking plates 8 and 9 can open and close.

In the pair of locking plates 8, 9, a temperature control mold 13 and a blow mold 14 are dividedly disposed in parallel. The two molds 13 and 14 can be alternately closed with the neck mold 5 each time the seat body 6 is reciprocated by a moving device 15 disposed between the base disk 1 and the seat body 6.

A blow rod 16 having an extendable rod 17 is disposed under the locking disk 2 at a stop position of the neck mold 5 and is adapted to ascend and descend through openings 18 provided in the supporting plate 4 and the carrying plate 3 at the stop position of the neck mold 5.

The moving device 15 is disposed in the seat body 6 and is composed of a cylinder 15a driven by hydraulic pressure or pneumatic pressure and a piston 15b. The cylinder 15a is horizontally fixed on the base disk 1 and the piston 15b is secured to the seat body 6, so that the latter 6 can be reciprocated along the guide member 7.

Figure 7:
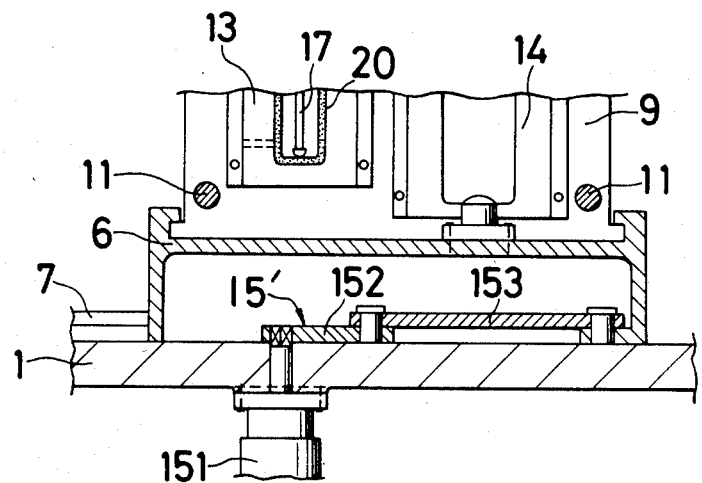
FIGS. 7 and 8 are partial sectional front views showing the operation of the temperature control blow molding equipment having a moving device in another embodiment.
Figure 8:
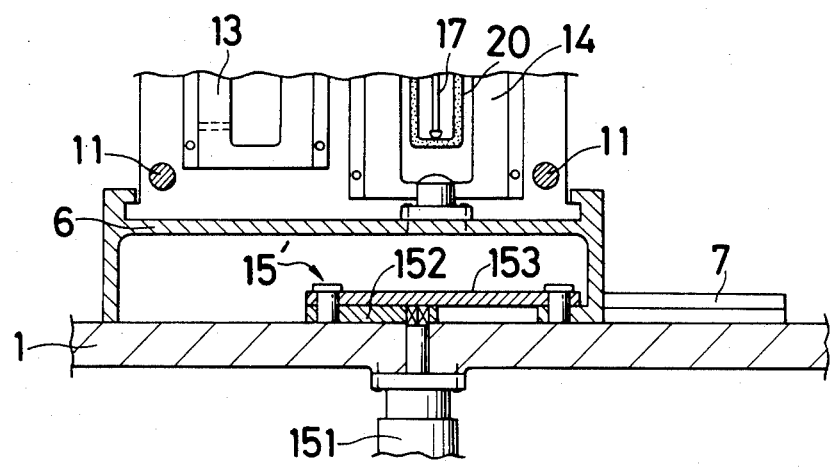

The above-mentioned moving device 15 may be configured in a different manner. For example, as illustrated in FIGS. 7 and 8, a driving shaft of a motor 151 provided under the base disk 1 is disposed in the base disk 1, and crank arms 152, 153 extends from the driving shaft to the seat body 6, by which crank arms 152, 153 the reciprocating motion of the seat body 6 can be carried out. This configuration of employing the crank arms, is preferable, since the speed of the seat body 6 is naturally reduced at times of the start and stop of its reciprocating motion.

Next, reference will be made to the operation of the temperature control blow molding equipment of the present invention.

A parison 19 molded in the injecting operation zone A is supported by the neck mold 5 and is carried to the stretch blow operation zone B together with the neck mold 5 by means of the rotation of the carrying plate 3. When it has stopped there, the supporting plate 4 is pressed from above by the locking disk 2 disposed thereon and it descends therefrom.

Prior to the descent of the supporting plate 4, in the blow operation zone B, the temperature control mold 13 has been carried to a stop position of the neck mold 5 by the reciprocating motion of the seat body 6 towards the direction and has been opening. Therefore, by the descent of the supporting plate 4, the parison 19 descends together with the neck mold 5 and is positioned at the center of the temperature control mold 13 (FIG. 3).

Figure 4:
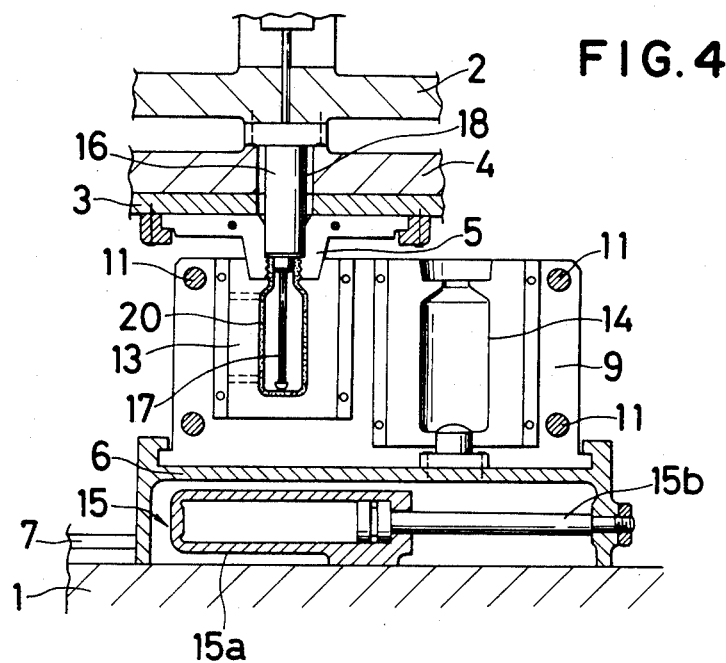

After the temperature control mold 13 has been closed there, the extendable rod 17 is extended, and air is then fed into the parison 19 to expand the latter till it has contacted with the inner wall of the temperature control mold 13, whereby the temperature control is carried out (FIG. 4).

Figure 5:
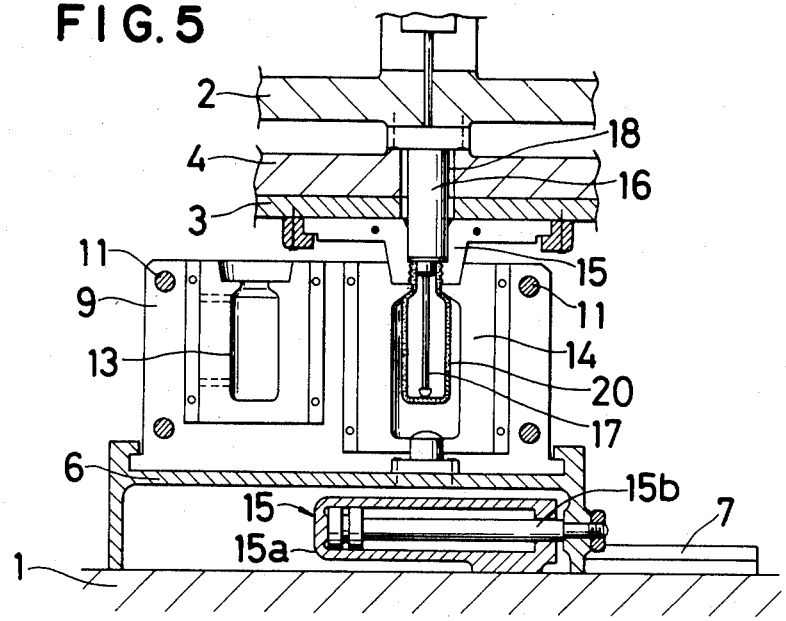

Afterward, the temperature control mold 13 is opened, and the seat body 6 and the molds 13 and 14 thereon are reciprocatively moved together towards the left to dispose the temperature-controlled parison 20 at the center of the blow mold 14 (FIG. 5).

Figure 6:
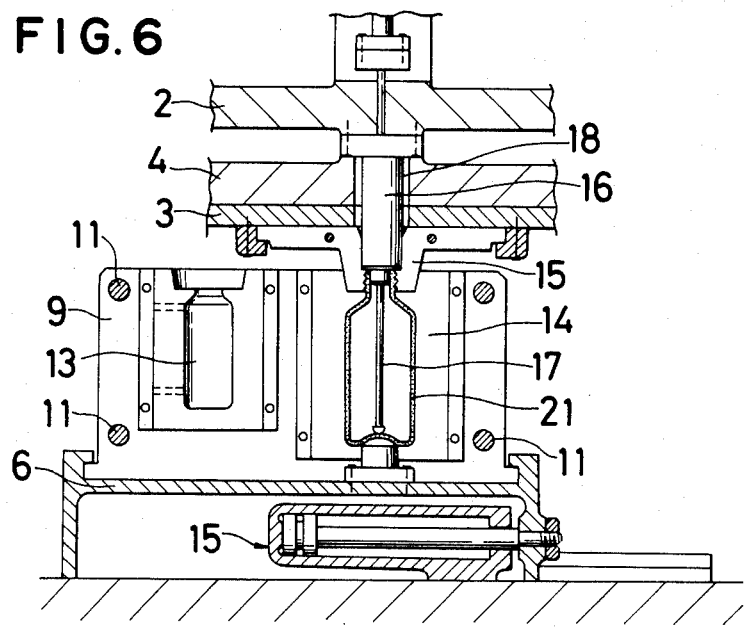

The blow mold 14 is then closed, and the extendable rod 17 is further extended in order to stretch the temperature-controlled parison 20 in an axial direction of the rod 17 and the air is aftwerward blown thereinto, so that an article 21 is molded (FIG. 6).

After the molding operation of the article 21 has been completed, the blow mold 14 is opened, and the supporting plate 4 is lifted to an upper original position by means of a hydraulic pressure type reset device 22 shown in FIG. 2. The molded article 21 is then carried to the removal operation zone C by means of the rotation of the carrying plate 3, while still held by the neck mold 5. In the blow operation zone B which the molded article 21 has already left, the molds are moved toward a right side together with the seat body 6, so that the temperature control mold 13 is located at the stop position of the neck mold 5 and is thus ready for the next parison treatment.

In the injection stretch blow molding machine in the aforesaid embodiment, the carrying plate 3 and the supporting plate 4 can move vertically, but they may also be of a stationary configuration, as in a molding machine disclosed in U.S. Pat. No. 4,105,391.

What is claimed is:

1. An injection molding apparatus, comprising:
   a rotating upper disk for rotatably carrying a plurality of neck molds for holding parisons;
   a stationary lower disk positioned beneath the upper disk having a series of spaced apart operation zones disposed thereon at locations where the parisons rotate with the upper disk to enter each of the operation zones, the operation zones comprising:
   a first operation zone having injection means for creating the parison;
   a second operation zone having removal means for removing the finished article; and
   a third operation zone, disposed between the first and second operation zones including
   guide members affixed to the lower disk;
   a seat body slidably received on the lower disk within the guide members to move in reciprocating fashion in the direction tangential to the rotation of the upper disk;
   first and second generally parallel locking plate means positioned on the seat body generally transverse to the direction of travel of the seat body;
   locking means for opening and closing the locking plates;
   a composite mold positioned between the locking plates and having a temperature control mold portion and a blow mold portion, the two portions being side by side generally along the travel of the seat body; and
   translation means for moving the seat body and the composite mold positioned thereon such that the temperature control mold portion and the blow mold portion successively receive the parison positioned at the third operation zone.

2. An injection molding apparatus as set forth in claim 1, wherein the locking means includes a fluid operator having a cylinder and a piston, where the piston is affixed to the first locking plate and a plurality of rods affix the cylinder to the periphery of the second plate, the first plate being positioned between the cylinder and the second plate.

3. An injection molding apparatus as set forth in claim 1, wherein the translation means includes a fluid operator having a cylinder and a fluid-operated piston having a free end, where the cylinder is affixed to the lower disk and the free end of the piston is affixed to the seat body for moving the seat body and in turn first positioning the temperature control mold portion around the parison and then positioning the blow mold portion around the parison.

4. An injection molding apparatus as set forth in claim 1, wherein the translation means includes a motor-operated crank arm having a drive end and a free end, where the motor is affixed to the lower disk and the drive end of the crank arm is connected to the motor and the free end is connected to the seat body for moving the seat body and in turn first positioning the temperature control mold portion around the parison and then positioning the blow mold portion around the parison.

5. An injection molding apparatus as set forth in claim 4, wherein the composite mold has two sections which close upon each other, each section having one half each of the temperature control mold portion and blow mold portion, respectively, and locking plates for clamping the two sections together.

6. An injection molding apparatus having three operation zones for molding an article from a parison, comprising:

injection means at one zone for creating the parison;

a composite mold at another zone having a temperature control portion for heating the parison, a blow mold portion for blow molding the parison into a finished article, and translation means for moving the composite mold such that the parison is first received by the temperature control portion and the parison is then received by the blow mold portion;

removal means at a further zone for removing the finished article; and rotary carrying means for carrying and moving the parison between the zones, from the injection means to the composite mold and to the removal means.

* * * * *